US009458748B2

(12) United States Patent
David et al.

(10) Patent No.: US 9,458,748 B2
(45) Date of Patent: *Oct. 4, 2016

(54) CONTROL APPARATUS FOR A DIESEL EXHAUST FLUID INJECTOR

(71) Applicant: GM GLOBAL TECHNOLOGY OPERATIONS LLC, Detroit, MI (US)

(72) Inventors: Giovanni David, Turin (IT); Raffaello Ardanese, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/447,313

(22) Filed: Jul. 30, 2014

(65) Prior Publication Data

US 2015/0034167 A1     Feb. 5, 2015

(30) Foreign Application Priority Data

Jul. 30, 2013   (GB) .................................. 1313585.0

(51) Int. Cl.
F01N 3/00      (2006.01)
F01N 3/20      (2006.01)
F01N 11/00     (2006.01)
G01K 15/00     (2006.01)
G01K 7/16      (2006.01)
F02D 41/20     (2006.01)

(52) U.S. Cl.
CPC ............. F01N 3/2046 (2013.01); F01N 3/208 (2013.01); F01N 11/005 (2013.01); G01K 7/16 (2013.01); G01K 15/005 (2013.01); F01N 2610/02 (2013.01); F01N 2610/11 (2013.01); F01N 2610/146 (2013.01); F01N 2900/0601 (2013.01); F01N 2900/14 (2013.01); F01N 2900/1811 (2013.01); F01N 2900/1812 (2013.01); F02D 41/20 (2013.01); F02D 2041/2051 (2013.01); F02D 2041/2058 (2013.01); F02D 2041/2065 (2013.01); G01K 2205/04 (2013.01); G01K 2217/00 (2013.01); Y02T 10/24 (2013.01); Y02T 10/47 (2013.01); Y10T 137/0329 (2015.04); Y10T 137/2541 (2015.04)

(58) Field of Classification Search
CPC .... F01N 3/208; F01N 3/2046; F01N 11/005; F01N 2900/1811; F01N 2900/1812; F02D 41/20; F02D 2041/2015; F02D 2041/2058; Y10T 137/2541
USPC .......... 60/274, 285, 286, 288, 316, 295, 303
See application file for complete search history.

(56) References Cited

U.S. PATENT DOCUMENTS 8,266,894 B2 *   9/2012  Perrin et al. ..................... 60/286
2010/0064668 A1  3/2010  Beckmann et al.
2010/0154385 A1* 6/2010  Perrin et al.
2013/0152554 A1  6/2013  Brueck et al.

* cited by examiner

Primary Examiner — Ching Chang
(74) Attorney, Agent, or Firm — Lorenz & Kopf LLP

(57) ABSTRACT

A control apparatus is disclosed for a diesel exhaust fluid injector located in an exhaust pipe of a diesel internal combustion engine. The control apparatus includes an electronic control unit configured to: energize a solenoid of the injector to perform a diesel exhaust fluid injection; determine an electric voltage value indicative of the electric voltage applied to the injector solenoid during the diesel exhaust fluid injection; determine an electric current value indicative of the electric current flowing through the injector solenoid during the diesel exhaust fluid injection; calculate an electric resistance value of the injector solenoid as a function of the determined electric voltage value and the electric current value; and estimate an injector temperature value as a function of the calculated electric resistance value.

16 Claims, 8 Drawing Sheets

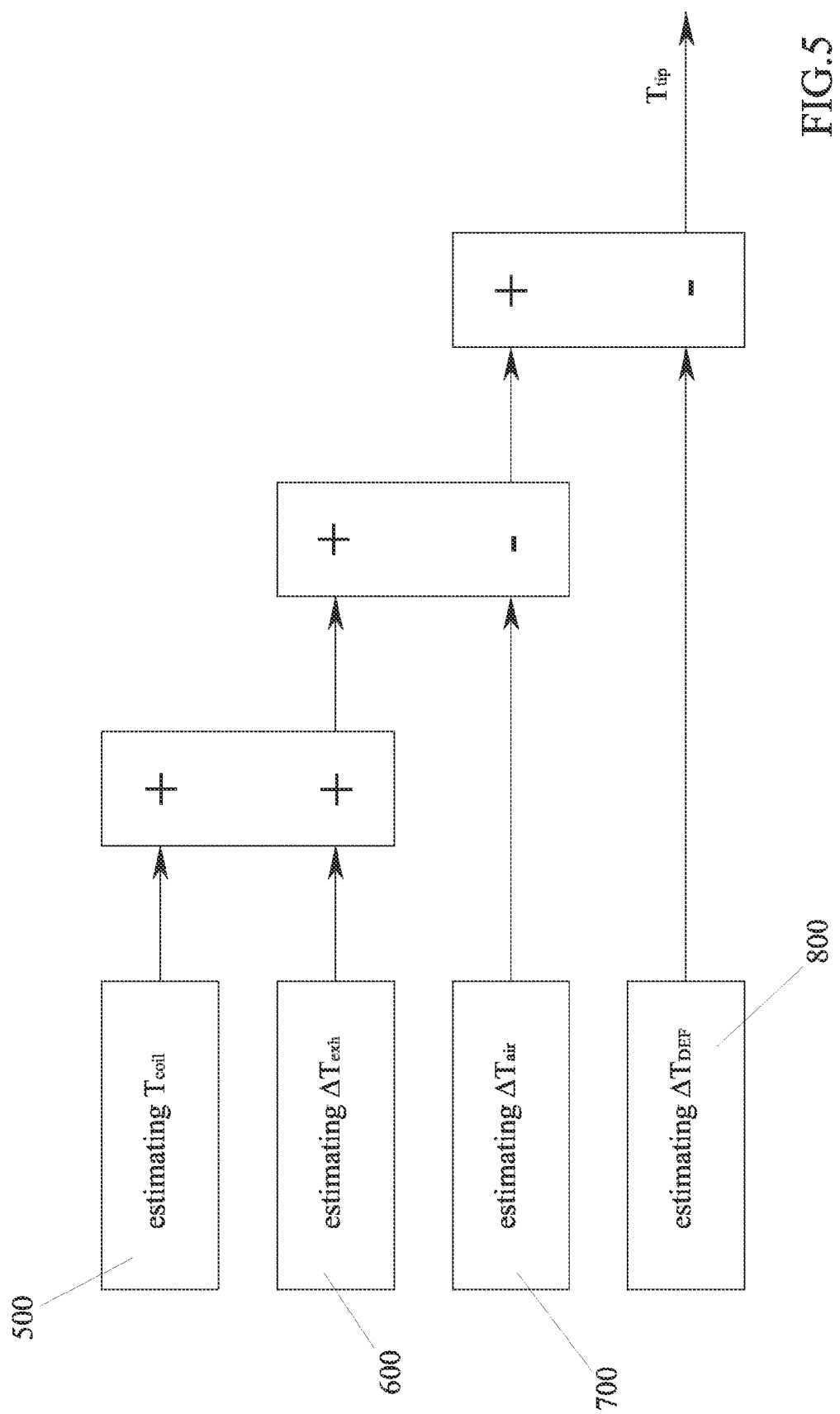

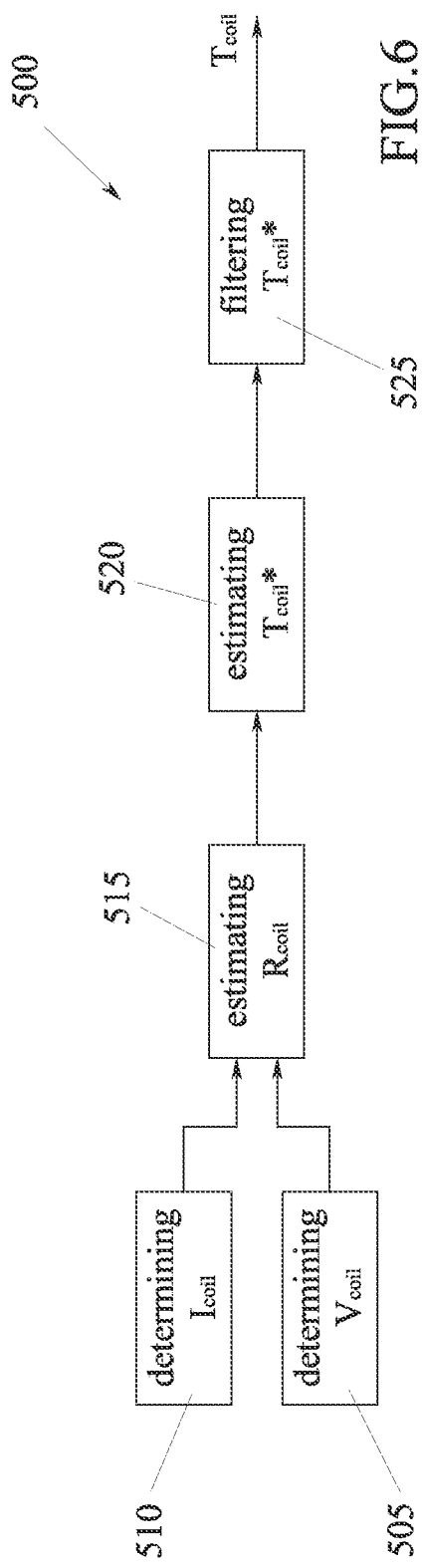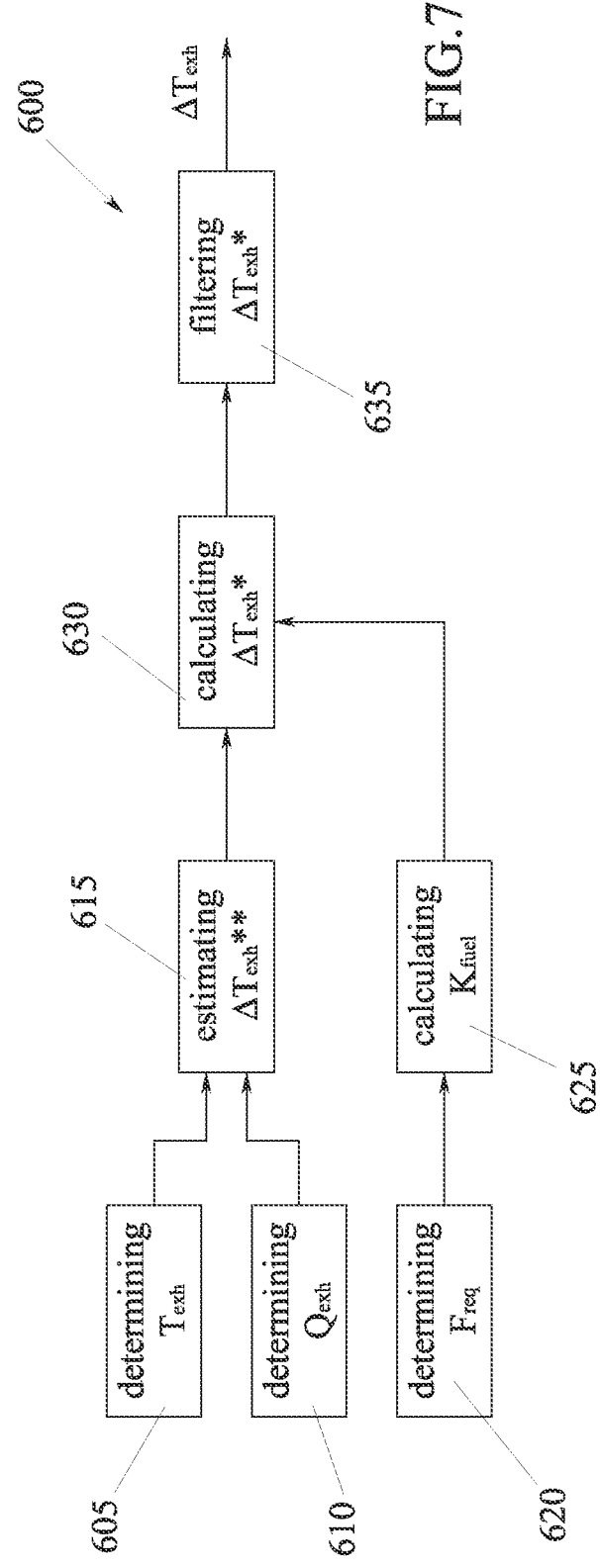

CONTROL APPARATUS FOR A DIESEL EXHAUST FLUID INJECTOR

CROSS REFERENCE TO RELATED APPLICATIONS

This application claims priority to GB Patent Application No. 1313585.0 filed Jul. 30, 2013, which is incorporated herein by reference in its entirety.

TECHNICAL FIELD

The technical field generally relates to a control apparatus for a Diesel Exhaust Fluid (DEF) injector that is located in an exhaust pipe of a diesel internal combustion engine, particularly a diesel engine of a motor vehicle.

BACKGROUND

It is known that a diesel engine of a motor vehicle conventionally includes an engine block defining at least one cylinder having a piston, and a cylinder head that closes the cylinder and cooperates with the piston to define a combustion chamber. A fuel and air mixture is disposed in the combustion chamber and ignited, resulting in hot expanding exhaust gasses that causes reciprocal movements of the piston, thereby rotating a crankshaft.

After the expansion, the exhaust gases exit the combustion chamber and are directed into an exhaust system which conventionally include an exhaust pipe having one or more exhaust after treatment devices. The after treatment devices may be any device configured to change the composition of the exhaust gases, in order to reduce the polluting emissions of the engine. Among these after treatment devices, the exhaust system may include a selective catalytic reduction (SCR) system.

An SCR system usually includes a catalytic device in which the nitrogen oxides ($NO_x$) contained in the exhaust gases are reduced into diatonic nitrogen ($N_2$) and water ($H_2O$), with the aid of a gaseous reducing agent that is absorbed inside catalyst. This reducing agent is obtained by injecting a Diesel Exhaust Fluid (DEF) into the exhaust pipe, upstream of the catalytic device. The DEF is generally an aqueous solution of urea ($CH_4N_2O$) which mixes with the hot exhaust gases and is converted thereby into ammonia ($NH_3$).

The DEF is injected into the exhaust pipe by one DEF injector, which is in fluid communication with a DEF pump that increases the pressure of the DEF received from a DEF tank. The DEF injector may be a conventional solenoid injector that includes an external casing having a nozzle, a valve member shaped as a needle located in the external casing, a spring biasing the needle to close the nozzle, and a solenoid (e.g. electric coil) that can be energized to generate a magnetic field that moves the needle to open the nozzle and let the DEF into the exhaust pipe. The opening of the DEF injector is usually commanded by an Electronic Control Unit (ECU), following known strategies that determine a target or requested DEF quantity to be injected and energize the solenoid of the DEF injector accordingly.

A drawback of the SCR system is that the DEF injector, being located in direct contact with the exhaust gases flowing in the exhaust pipe, is sometimes heated up to very high temperatures, which may affect its operation and also cause irreversible damage to its nozzle and needle.

However, the DEF injectors currently used in the SCR systems are not provided with a temperature sensor, so that the ECU cannot implement any protection strategy to prevent the above mentioned drawback.

SUMMARY

In view of the above, the present disclosure provides a solution for estimating the temperature of a DEF injector and for protecting the DEF injector from excessive thermal stresses. This solution represent a simple, rational and rather inexpensive solution.

In particular, an embodiment of the present disclosure provides a control apparatus for a diesel exhaust fluid (DEF) injector located in an exhaust pipe of a diesel internal combustion engine. The control apparatus includes an electronic control unit (ECU) configured to: energize a solenoid of the injector to perform a diesel exhaust fluid injection; determine an electric voltage value indicative of the electric voltage applied to the injector solenoid during the diesel exhaust fluid injection; determine an electric current value indicative of the electric current flowing through the injector solenoid during the diesel exhaust fluid injection; calculate an electric resistance value of the injector solenoid as a function of the determined electric voltage value and the electric current value; and estimate an injector temperature value as a function of the calculated electric resistance value.

Since a correlation exists between the electric resistance of the injector solenoid and its own temperature, this embodiment of the present disclosure advantageously allows the ECU to estimate the temperature of the electric solenoid actuating the needle of the DEF injector, which may be considered a primary indication of the temperature of the DEF injector itself.

According to an aspect of the present disclosure, the electronic control unit may be configured to determine the electric current value as a maximum value of the electric current flowing through the injector solenoid during the diesel exhaust fluid injection. This configuration has the advantage of being particularly reliable especially when the injector solenoid is energized by a device driver that implements a simple Pulse Width Modulation (PWM) strategy.

According to another aspect of the present disclosure, the electronic control unit may be configured to determine the electric current value as an average value of the electric current flowing through the injector solenoid during the diesel exhaust fluid injection. This configuration has the advantage of being particularly reliable especially the injector solenoid is energized by a device driver that implements a Peak and Hold strategy.

As mentioned above, the temperature of the injector solenoid may be considered a valuable primary indication of the temperature of the entire DEF injector. However, some aspects of the present disclosure provides for taking into account other thermal contributions, which may improve the reliability of the DEF injector estimation and/or to focus the temperature estimation on particular parts of the DEF injector, such as for example the tip of its nozzle.

According to one of these aspects of the present disclosure, the electronic control unit may be configured to: determine an exhaust temperature value indicative of the temperature of the exhaust gas flowing along the exhaust pipe during the diesel exhaust fluid injection; determine an exhaust mass flow rate value indicative of the mass flow rate of the exhaust gas flowing along the exhaust pipe during the diesel exhaust fluid injection; estimate an exhaust gas contribution to the injector temperature as a function of the determined exhaust temperature value and exhaust mass flow rate value; and correct the estimated value of the injector temperature with that exhaust gas contribution.

This aspect of the present disclosure takes into account that the DEF injector is in direct contact with the hot exhaust gases flowing into the exhaust pipe. This contact causes a heat exchange between the DEF injector and the exhaust gases, which generally depends on the exhaust gas temperature and mass flow rate. The exhaust gas contribution may effectively quantify the thermal effect of this heat exchange, thereby advantageously improving the reliability of the estimated temperature value.

According to another aspect of the present disclosure, the electronic control unit may be configured to: determine a fuel quantity value that is requested to be injected in the diesel engine during the diesel exhaust fluid injection; calculate a correction factor for the exhaust gas contribution as a function of the determined fuel quantity value; and correct the estimated exhaust gas contribution with the calculated correction factor.

This aspect of the present disclosure takes into account that the requested fuel quantity (engine load) has an impact of the delay between the instant in which the exhaust gases exit the engine and the instant in which they reach the DEF injector. The correction factor may effectively quantify the thermal effect of this delay, thereby advantageously improving the reliability of the exhaust gas contribution to the DEF injector temperature.

According to another aspect of the present disclosure, the electronic control unit may be configured to: determine an air temperature value indicative of the temperature of the ambient air flowing around an external casing of the injector during the diesel exhaust fluid injection; determine an air speed value indicative of the speed of the ambient air flowing around the external casing of the injector during the diesel exhaust fluid injection; estimate an air contribution to the injector temperature as a function of the determined air temperature value and air speed value; and correct the estimated value of the injector temperature with this air contribution.

This aspect of the present disclosure takes into account that the DEF injector has an external casing that is secured to the exhaust pipe but that is also exposed to the ambient air. That causes a heat exchange between the DEF injector and the ambient air, which generally depends on the air temperature and speed. The air contribution may effectively quantify the thermal effect of this heat exchange, thereby advantageously improving the reliability of the estimated temperature value.

According to another aspect of the present disclosure, the electronic control unit may be configured to: determine an ambient pressure value indicative of the ambient pressure during diesel exhaust fluid injection; calculate a correction factor for the air contribution as a function of the determined ambient pressure value; and correct the estimated air contribution with the calculated correction factor.

This aspect of the present disclosure takes into account that the ambient pressure has an impact on the density of the ambient air, which in its turn has an impact on the heat exchange between the ambient air and the DEF injector. The correction factor may effectively quantify the thermal effect of the ambient pressure, thereby advantageously improving the reliability of the air contribution to the DEF injector temperature.

According to another aspect of the present disclosure, the electronic control unit may be configured to: determine a diesel exhaust fluid temperature value indicative of the temperature of the diesel exhaust fluid flowing through the injector during the diesel exhaust fluid injection; determine a diesel exhaust fluid mass flow rate value indicative of the mass flow rate of the of the diesel exhaust fluid flowing through the injector during the diesel exhaust fluid injection; estimate a diesel exhaust fluid contribution to the injector temperature as a function of the determined diesel exhaust fluid temperature value and diesel exhaust fluid mass flow rate value; and correct the estimated value of the injector temperature with this diesel exhaust fluid contribution.

This aspect of the present disclosure takes into account that the DEF injector is in direct contact also with the injected DEF. That causes a heat exchange between the DEF injector and the DEF, which generally depends on the DEF temperature and mass flow rate. The DEF contribution may effectively quantify the thermal effect of this heat exchange, thereby advantageously improving the reliability of the estimated temperature value.

Turning now to the DEF injection involved in the estimation of the DEF injector temperature, it may be performed by the electronic control unit in response to a conventional operating strategy of the SCR system, aimed to reduce the $NO_x$ emissions of the engine. However, there may be long periods, during which the operating strategy of the SCR system does not require any injections of DEF, so that it would be impossible to estimate the DEF injector temperature.

To overcome this drawback, an aspect of the present disclosure provides a criteria for activating DEF injections even if they are not requested by the SCR operating strategy, thereby allowing the estimation of the DEF injector temperature.

According to this aspect of the present disclosure, the electronic control unit may be configured to: determine an exhaust temperature value indicative of the temperature of the exhaust gas flowing along the exhaust pipe; and perform the diesel exhaust fluid injection, if the determined exhaust temperature value exceeds a predetermined threshold value of the exhaust gas temperature. This exhaust temperature based criteria is advantageous because the DEF injection is activated only if an overheating of the DEF injector is actually envisaged, thereby reducing DEF consumption.

According to another aspect of the present disclosure, the electronic control unit may be configured to activate a cooling phase of the injector, if the estimated value of the injector temperature exceeds a predetermined threshold value thereof. In this way, it is advantageously possible to protect the DEF injector from potential overheating that causes malfunctions or damages.

According to an aspect of the present disclosure, the cooling phase may provide for the electronic control unit to: determine a diesel exhaust fluid quantity to be injected to cool the injector; and energize the injector to inject the determined quantity of diesel exhaust fluid. In this way, the DEF injector is advantageously cooled by the DEF flowing therethrough, without requiring the installation of any dedicated, complicated and expensive cooling systems.

According to an aspect of the present disclosure, the determination of the diesel exhaust fluid quantity may provide for the electronic control unit to: determine a diesel exhaust fluid temperature value indicative of the temperature of the diesel exhaust fluid to be injected; and calculate the diesel exhaust fluid quantity as a function of the determined diesel exhaust fluid temperature value and of the estimated value of the injector temperature. This aspect of the present disclosure advantageously allows to determine a minimum DEF quantity that is sufficient to cool the DEF injector, thereby reducing as much as possible DEF consumption.

According to another aspect of the present disclosure, the determination of the diesel exhaust fluid quantity may provide for the electronic control unit to: determine an air temperature value indicative of the temperature of the ambient air flowing around an external casing of the injector; determine an air speed value indicative of the speed of the ambient air flowing around the injector external casing; calculate a correction factor for the diesel exhaust fluid quantity as a function of the determined air temperature value and air speed value; and correct the calculated diesel exhaust fuel quantity with the calculated correction factor. This aspect of the present disclosure advantageously improves the effectiveness of the cooling phase by taking into account also the heat exchange between the DEF injector and the ambient air.

Another embodiment of the present disclosure provides a method of controlling a diesel exhaust fluid (DEF) injector located in an exhaust pipe of a diesel internal combustion engine, wherein the method includes: energizing a solenoid of the injector to perform a diesel exhaust fluid injection; determining an electric voltage value indicative of the electric voltage applied to the injector solenoid during the diesel exhaust fluid injection; determining an electric current value indicative of the electric current flowing through the injector solenoid during the diesel exhaust fluid injection; calculating an electric resistance value of the injector solenoid as a function of the determined electric voltage value and the electric current value; and estimating an injector temperature value as a function of the calculated electric resistance value. This embodiment of the present disclosure achieves basically the same advantages of the control system described above, in particular those of allowing the estimation of the temperature of the electric solenoid actuating the needle of the DEF injector, which may be considered a primary indication of the temperature of the DEF injector itself.

According to an aspect of the present disclosure, the electric current value may be determined as a maximum value of the electric current flowing through the injector solenoid during the diesel exhaust fluid injection. This aspect has the advantage of being particularly reliable especially when the injector solenoid is energized by a device driver that implements a simple Pulse Width Modulation (PWM) strategy.

According to another aspect of the present disclosure, the electric current value may be determined as an average value of the electric current flowing through the injector solenoid during the diesel exhaust fluid injection. This aspect has the advantage of being particularly reliable especially the injector solenoid is energized by a device driver that implements a Peak and Hold strategy.

According to another aspect of the present disclosure, the method may further include: determining an exhaust temperature value indicative of the temperature of the exhaust gas flowing along the exhaust pipe during the diesel exhaust fluid injection; determining an exhaust mass flow rate value indicative of the mass flow rate of the exhaust gas flowing along the exhaust pipe during the diesel exhaust fluid injection; estimating an exhaust gas contribution to the injector temperature as a function of the determined exhaust temperature value and exhaust mass flow rate value; and correcting the estimated value of the injector temperature with that exhaust gas contribution. This aspect of the present disclosure takes into account that the DEF injector is in direct contact with the hot exhaust gases flowing into the exhaust pipe. This contact causes a heat exchange between the DEF injector and the exhaust gases, which generally depends on the exhaust gas temperature and mass flow rate. The exhaust gas contribution may effectively quantify the thermal effect of this heat exchange, thereby advantageously improving the reliability of the estimated temperature value.

According to another aspect of the present disclosure, the method may further include: determining a fuel quantity value that is requested to be injected in the diesel engine during the diesel exhaust fluid injection; calculating a correction factor for the exhaust gas contribution as a function of the determined fuel quantity value; and correcting the estimated exhaust gas contribution with the calculated correction factor. This aspect of the present disclosure takes into account that the requested fuel quantity (engine load) has an impact of the delay between the instant in which the exhaust gases exit the engine and the instant in which they reach the DEF injector. The correction factor may effectively quantify the thermal effect of this delay, thereby advantageously improving the reliability of the exhaust gas contribution to the DEF injector temperature.

According to another aspect of the present disclosure, the method may further include: determining an air temperature value indicative of the temperature of the ambient air flowing around an external casing of the injector during the diesel exhaust fluid injection; determining an air speed value indicative of the speed of the ambient air flowing around the external casing of the injector during the diesel exhaust fluid injection; estimating an air contribution to the injector temperature as a function of the determined air temperature value and air speed value; and correcting the estimated value of the injector temperature with this air contribution. This aspect of the present disclosure takes into account that the DEF injector has an external casing that is secured to the exhaust pipe but that is also exposed to the ambient air. That causes a heat exchange between the DEF injector and the ambient air, which generally depends on the air temperature and speed. The air contribution may effectively quantify the thermal effect of this heat exchange, thereby advantageously improving the reliability of the estimated temperature value.

According to another aspect of the present disclosure, the method may further include: determining an ambient pressure value indicative of the ambient pressure during diesel exhaust fluid injection; calculating a correction factor for the air contribution as a function of the determined ambient pressure value; and correcting the estimated air contribution with the calculated correction factor. This aspect of the present disclosure takes into account that the ambient pressure has an impact on the density of the ambient air, which in its turn has an impact on the heat exchange between the ambient air and the DEF injector. The correction factor may effectively quantify the thermal effect of the ambient pressure, thereby advantageously improving the reliability of the air contribution to the DEF injector temperature.

According to another aspect of the present disclosure, the method may further include: determining a diesel exhaust fluid temperature value indicative of the temperature of the diesel exhaust fluid flowing through the injector during the diesel exhaust fluid injection; determining a diesel exhaust fluid mass flow rate value indicative of the mass flow rate of the of the diesel exhaust fluid flowing through the injector during the diesel exhaust fluid injection; estimating a diesel exhaust fluid contribution to the injector temperature as a function of the determined diesel exhaust fluid temperature value and diesel exhaust fluid mass flow rate value; and correcting the estimated value of the injector temperature with this diesel exhaust fluid contribution. This aspect of the present disclosure takes into account that the DEF injector is in direct contact also with the injected DEF. That causes a heat exchange between the DEF injector and the DEF, which generally depends on the DEF temperature and mass flow rate. The DEF contribution may effectively quantify the thermal effect of this heat exchange, thereby advantageously improving the reliability of the estimated temperature value.

Turning now to the DEF injection involved in the estimation of the DEF injector temperature, it may be performed by the electronic control unit in response to a conventional operating strategy of the SCR system, aimed to reduce the $NO_x$ emissions of the engine. However, there may be long period, during which the operating strategy of the SCR system does not require any injections of DEF, so that it would be impossible to estimate the DEF injector temperature. To overcome this drawback, an aspect of the present disclosure provides a criteria for activating DEF injections even if they are not requested by the SCR operating strategy, thereby allowing the estimation of the DEF injector temperature.

According to this aspect of the present disclosure, the method may further include: determining an exhaust temperature value indicative of the temperature of the exhaust gas flowing along the exhaust pipe; and performing the diesel exhaust fluid injection, if the determined exhaust temperature value exceeds a predetermined threshold value of the exhaust gas temperature. This exhaust temperature based criteria is advantageous because the DEF injection is activated only if an overheating of the DEF injector is actually envisaged, thereby reducing DEF consumption.

According to another aspect of the present disclosure, the method may include the further step of activating a cooling phase of the injector, if the estimated value of the injector temperature exceeds a predetermined threshold value thereof. In this way, it is advantageously possible to protect the DEF injector from potential overheating that causes malfunctions or damages.

According to an aspect of the present disclosure, the method may further include: determining a diesel exhaust fluid quantity to be injected to cool the injector; and energizing the injector to inject the determined quantity of diesel exhaust fluid. In this way, the DEF injector is advantageously cooled by the DEF flowing therethrough, without requiring the installation of any dedicated, complicated and expensive cooling systems.

According to an aspect of the present disclosure, the determination of the diesel exhaust fluid quantity may include: determining a diesel exhaust fluid temperature value indicative of the temperature of the diesel exhaust fluid to be injected; and calculating the diesel exhaust fluid quantity as a function of the determined diesel exhaust fluid temperature value and of the estimated value of the injector temperature. This aspect of the present disclosure advantageously allows to determine a minimum DEF quantity that is sufficient to cool the DEF injector, thereby reducing as much as possible DEF consumption.

According to another aspect of the present disclosure, the determination of the diesel exhaust fluid quantity may include: determining an air temperature value indicative of the temperature of the ambient air flowing around an external casing of the injector; determining an air speed value indicative of the speed of the ambient air flowing around the injector external casing; calculating a correction factor for the diesel exhaust fluid quantity as a function of the determined air temperature value and air speed value; and correcting the calculated diesel exhaust fuel quantity with the calculated correction factor. This aspect of the present disclosure advantageously improves the effectiveness of the cooling phase by taking into account also the heat exchange between the DEF injector and the ambient air.

The method can be carried out with the help of a computer program including a program-code for carrying out all the steps of the method described above, and in the form of a computer program product including the computer program. The method can be also embodied as an electromagnetic signal, said signal being modulated to carry a sequence of data bits which represent a computer program to carry out all steps of the method.

Another embodiment of the present disclosure provides an apparatus for controlling a diesel exhaust fluid (DEF) injector located in an exhaust pipe of a diesel internal combustion engine, wherein the apparatus includes: means for energizing a solenoid of the injector to perform a diesel exhaust fluid injection; means for determining an electric voltage value indicative of the electric voltage applied to the injector solenoid during the diesel exhaust fluid injection; means for determining an electric current value indicative of the electric current flowing through the injector solenoid during the diesel exhaust fluid injection; means for calculating an electric resistance value of the injector solenoid as a function of the determined electric voltage value and the electric current value; and means for estimating an injector temperature value as a function of the calculated electric resistance value. This embodiment of the present disclosure achieves basically the same advantages of the control system described above, in particular those of allowing the estimation of the temperature of the electric solenoid actuating the needle of the DEF injector, which may be considered a primary indication of the temperature of the DEF injector itself.

According to an aspect of the present disclosure, the electric current value may be determined as a maximum value of the electric current flowing through the injector solenoid during the diesel exhaust fluid injection. This aspect has the advantage of being particularly reliable especially when the injector solenoid is energized by a device driver that implements a simple Pulse Width Modulation (PWM) strategy.

According to another aspect of the present disclosure, the electric current value may be determined as an average value of the electric current flowing through the injector solenoid during the diesel exhaust fluid injection. This aspect has the advantage of being particularly reliable especially the injector solenoid is energized by a device driver that implements a Peak and Hold strategy.

According to another aspect of the present disclosure, the apparatus may further include: means for determining an exhaust temperature value indicative of the temperature of the exhaust gas flowing along the exhaust pipe during the diesel exhaust fluid injection; means for determining an exhaust mass flow rate value indicative of the mass flow rate of the exhaust gas flowing along the exhaust pipe during the diesel exhaust fluid injection; means for estimating an exhaust gas contribution to the injector temperature as a function of the determined exhaust temperature value and exhaust mass flow rate value; and means for correcting the estimated value of the injector temperature with that exhaust gas contribution. This aspect of the present disclosure takes into account that the DEF injector is in direct contact with the hot exhaust gases flowing into the exhaust pipe. This contact causes a heat exchange between the DEF injector and the exhaust gases, which generally depends on the exhaust gas temperature and mass flow rate. The exhaust gas contribution may effectively quantify the thermal effect of this heat exchange, thereby advantageously improving the reliability of the estimated temperature value.

According to another aspect of the present disclosure, the apparatus may further include: means for determining a fuel quantity value that is requested to be injected in the diesel engine during the diesel exhaust fluid injection; means for calculating a correction factor for the exhaust gas contribution as a function of the determined fuel quantity value; and means for correcting the estimated exhaust gas contribution with the calculated correction factor. This aspect of the present disclosure takes into account that the requested fuel quantity (engine load) has an impact of the delay between the instant in which the exhaust gases exit the engine and the instant in which they reach the DEF injector. The correction factor may effectively quantify the thermal effect of this delay, thereby advantageously improving the reliability of the exhaust gas contribution to the DEF injector temperature.

According to another aspect of the present disclosure, the apparatus may further include: means for determining an air temperature value indicative of the temperature of the ambient air flowing around an external casing of the injector during the diesel exhaust fluid injection; means for determining an air speed value indicative of the speed of the ambient air flowing around the external casing of the injector during the diesel exhaust fluid injection; means for estimating an air contribution to the injector temperature as a function of the determined air temperature value and air speed value; and means for correcting the estimated value of the injector temperature with this air contribution. This aspect of the present disclosure takes into account that the DEF injector has an external casing that is secured to the exhaust pipe but that is also exposed to the ambient air. That causes a heat exchange between the DEF injector and the ambient air, which generally depends on the air temperature and speed. The air contribution may effectively quantify the thermal effect of this heat exchange, thereby advantageously improving the reliability of the estimated temperature value.

According to another aspect of the present disclosure, the apparatus may further include: means for determining an ambient pressure value indicative of the ambient pressure during diesel exhaust fluid injection; means for calculating a correction factor for the air contribution as a function of the determined ambient pressure value; and means for correcting the estimated air contribution with the calculated correction factor. This aspect of the present disclosure takes into account that the ambient pressure has an impact on the density of the ambient air, which in its turn has an impact on the heat exchange between the ambient air and the DEF injector. The correction factor may effectively quantify the thermal effect of the ambient pressure, thereby advantageously improving the reliability of the air contribution to the DEF injector temperature.

According to another aspect of the present disclosure, the apparatus may further include: means for determining a diesel exhaust fluid temperature value indicative of the temperature of the diesel exhaust fluid flowing through the injector during the diesel exhaust fluid injection; means for determining a diesel exhaust fluid mass flow rate value indicative of the mass flow rate of the of the diesel exhaust fluid flowing through the injector during the diesel exhaust fluid injection; means for estimating a diesel exhaust fluid contribution to the injector temperature as a function of the determined diesel exhaust fluid temperature value and diesel exhaust fluid mass flow rate value; and means for correcting the estimated value of the injector temperature with this diesel exhaust fluid contribution. This aspect of the present disclosure takes into account that the DEF injector is in direct contact also with the injected DEF. That causes n heat exchange between the DEF injector and the DEF, which generally depends on the DEF temperature and mass flow rate. The DEF contribution may effectively quantify the thermal effect of this heat exchange, thereby advantageously improving the reliability of the estimated temperature value.

Turning now to the DEF injection involved in the estimation of the DEF injector temperature, it may be performed by the electronic control unit in response to a conventional operating strategy of the SCR system, aimed to reduce the $NO_x$ emissions of the engine. However, there may be long period, during which the operating strategy of the SCR system does not require any injections of DEF, so that it would be impossible to estimate the DEF injector temperature. To overcome this drawback, an aspect of the present disclosure provides a criteria for activating DEF injections even if they are not requested by the SCR operating strategy, thereby allowing the estimation of the DEF injector temperature.

According to this aspect of the present disclosure, the apparatus may further include: means for determining an exhaust temperature value indicative of the temperature of the exhaust gas flowing along the exhaust pipe; and means for performing the diesel exhaust fluid injection, if the determined exhaust temperature value exceeds a predetermined threshold value of the exhaust gas temperature. This exhaust temperature based criteria is advantageous because the DEF injection is activated only if an overheating of the DEF injector is actually envisaged, thereby reducing DEF consumption.

According to another aspect of the present disclosure, the apparatus may further include means for activating a cooling phase of the injector, if the estimated value of the injector temperature exceeds a predetermined threshold value thereof. In this way, it is advantageously possible to protect the DEF injector from potential overheating that causes malfunctions or damages.

According to an aspect of the present disclosure, the apparatus may further include: means for determining a diesel exhaust fluid quantity to be injected to cool the injector; and means for energizing the injector to inject the determined quantity of diesel exhaust fluid. In this way, the DEF injector is advantageously cooled by the DEF flowing therethrough, without requiring the installation of any dedicated, complicated and expensive cooling systems.

According to an aspect of the present disclosure, the means for determining the diesel exhaust fluid quantity may include: means for determining a diesel exhaust fluid temperature value indicative of the temperature of the diesel exhaust fluid to be injected; and means for calculating the diesel exhaust fluid quantity as a function of the determined diesel exhaust fluid temperature value and of the estimated value of the injector temperature. This aspect of the present disclosure advantageously allows to determine a minimum DEF quantity that is sufficient to cool the DEF injector, thereby reducing as much as possible DEF consumption.

According to another aspect of the present disclosure, the means for determining the diesel exhaust fluid quantity may include: means for determining an air temperature value indicative of the temperature of the ambient air flowing around an external casing of the injector; means for determining an air speed value indicative of the speed of the ambient air flowing around the injector external casing; means for calculating a correction factor for the diesel exhaust fluid quantity as a function of the determined air temperature value and air speed value; and means for correcting the calculated diesel exhaust fuel quantity with the calculated correction factor. This aspect of the present disclosure advantageously improves the effectiveness of the cooling phase by taking into account also the heat exchange between the DEF injector and the ambient air.

BRIEF DESCRIPTION OF THE DRAWINGS

The present disclosure will hereinafter be described in conjunction with the following drawing figures, wherein like numerals denote like elements, and:

FIG. 5 is a flowchart representing a method for estimating the temperature of the DEF injector of FIG. 4;

FIG. 6 is a flowchart representing a method for estimating the term $T_{coil}$ in the method of FIG. 5;

FIG. 7 is a flowchart representing a method for estimating the term $\Delta T_{exh}$ in the method of FIG. 5;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
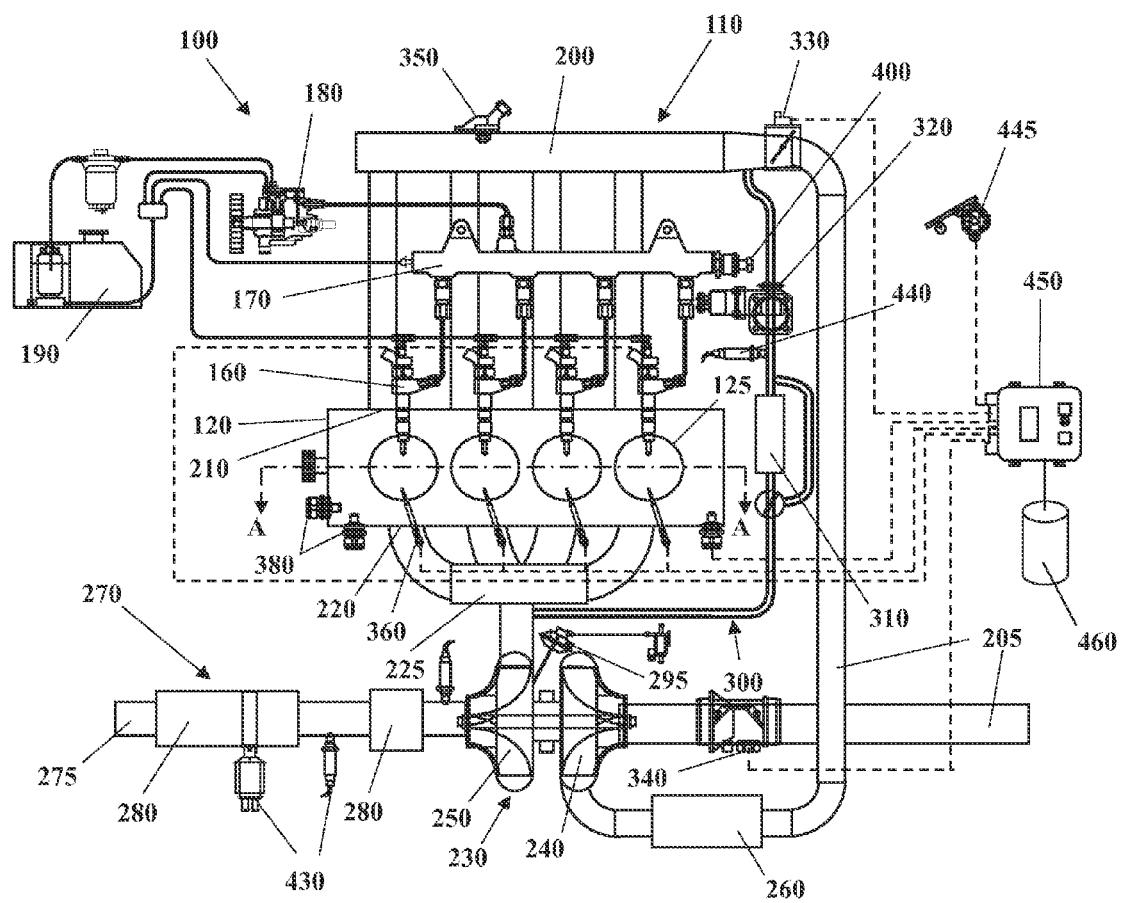
FIG. 1 schematically shows a powertrain of an automotive system.
Figure 2:
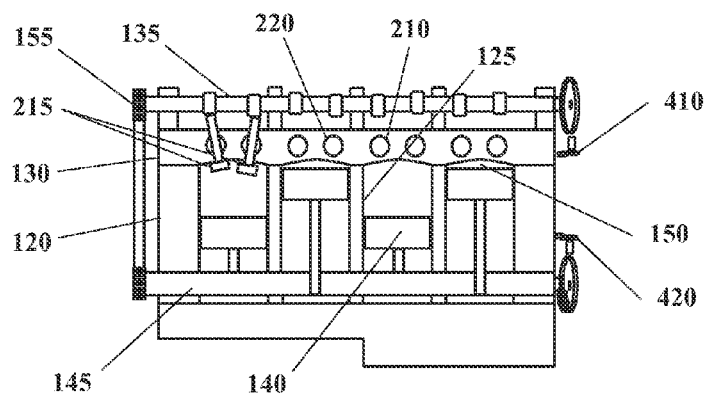
FIG. 2 is the section A-A of FIG. 1.

Some embodiments may include an automotive system 100, as shown in FIGS. 1 and 2, that includes a diesel internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 295 arranged to move the vanes to alter the flow of the exhaust gases through the turbine 250. In other embodiments, the turbocharger 230 may be fixed geometry and/or include a waste gate.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The exhaust system 270 may include an exhaust pipe 275 having one or more exhaust after treatment devices 280. The after treatment devices may be any device configured to change the composition of the exhaust gases. Some examples of after treatment devices 280 include, but are not limited to, catalytic converters (two and three way), oxidation catalysts, lean NOx traps, hydrocarbon adsorbers, particulate filters, and selective catalytic reduction (SCR) systems.

Figure 3:
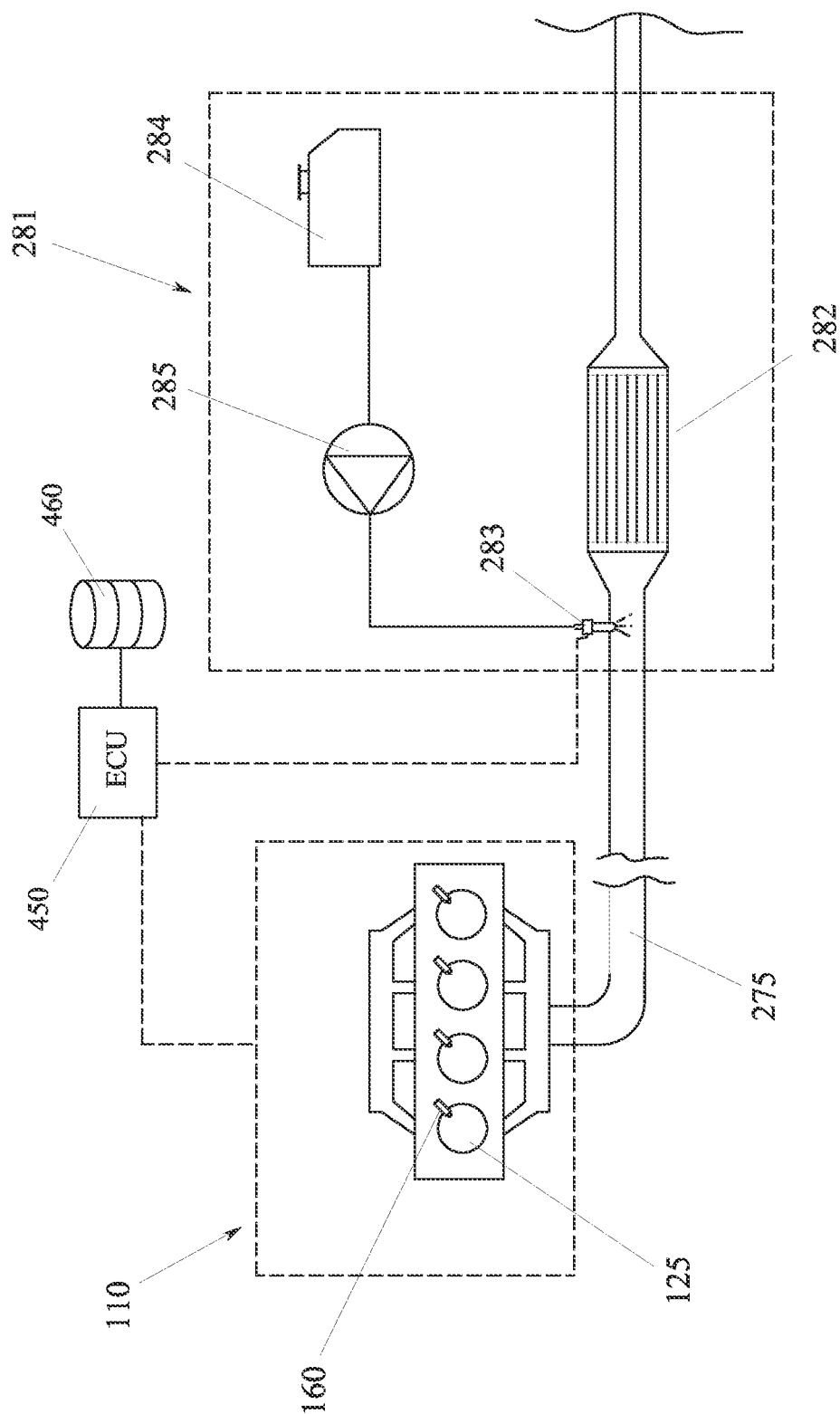
FIG. 3 schematically shows an SCR system of the automotive system of FIG. 1.

A selective catalytic reduction (SCR) system 281 is represented in FIG. 3. The SCR system 281 may include a SCR catalyst 282, which is located in the exhaust pipe 275, and an injector 283, which is locates in the exhaust pipe 275 upstream of the SCR catalyst 282. The injector 283 is provided for injecting into the exhaust pipe 275 a Diesel Exhaust Fluid (DEF), for example urea, which mixes with the exhaust gases and is converted thereby into a gaseous reducing agent (e.g. ammonia). This gaseous reducing agent is absorbed inside SCR catalyst 282, thereby prompting the reduction of the nitrogen oxides ($NO_x$) contained in the exhaust gases into diatonic nitrogen ($N_2$) and water ($H_2O$). The DEF is stored in a DEF tank 284 and is provided to the injector 283 by means of a DEF pump 285, which is in fluid communication with both the DEF tank 284 and the injector 283.

Figure 4:
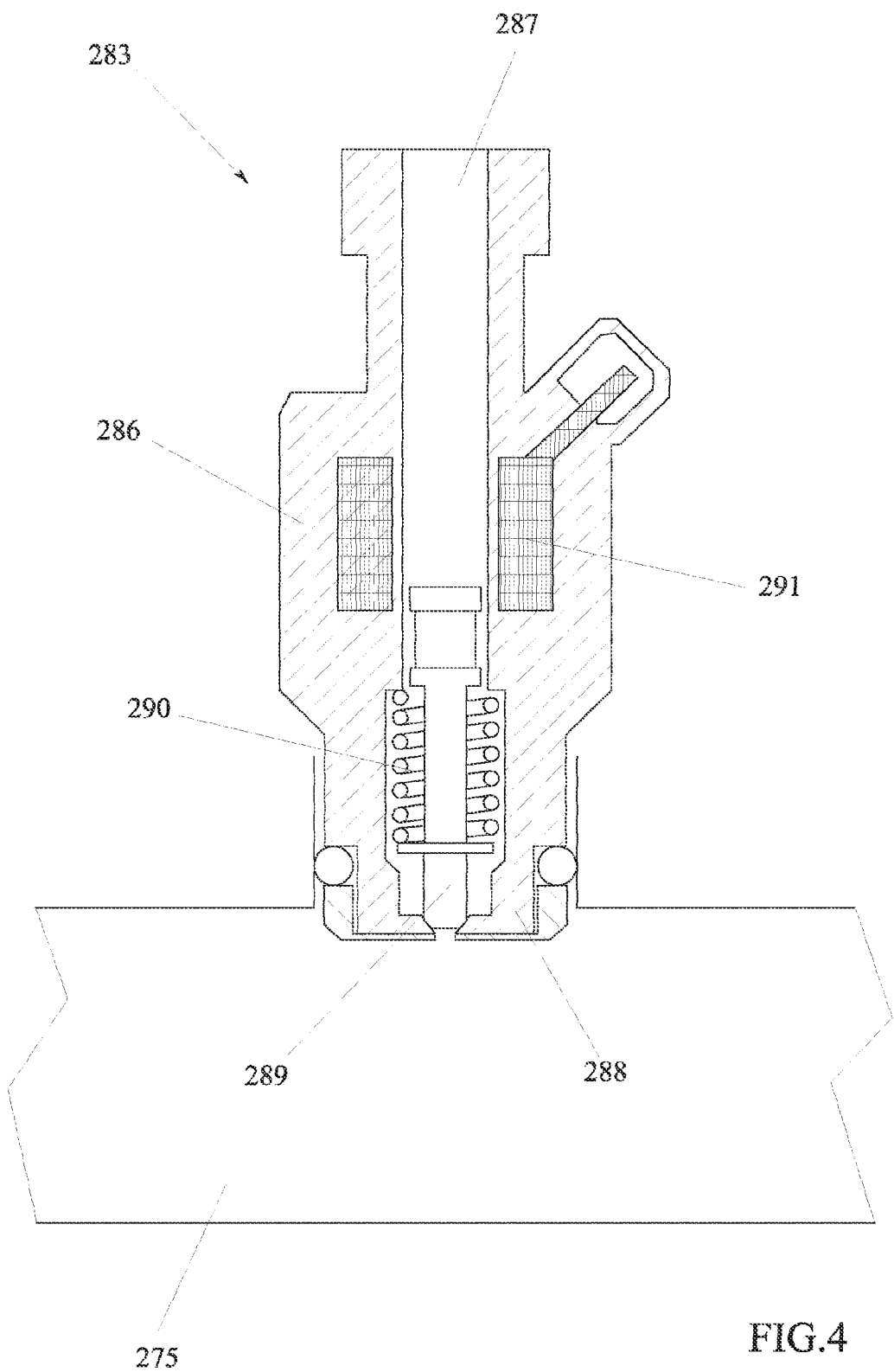
FIG. 4 is a schematic cross section of a DEF injector of the SCR system of FIG. 3.

As shown in FIG. 4, the injector 283 may include a casing 286 having an inlet 287 for the DEF coming from the DEF pump 285 and a nozzle 288 for injecting the DEF into the exhaust pipe 275. The injector 283 is secured to the exhaust pipe 275, so that the nozzle 288 is located inside the exhaust pipe 275, whereas the remaining portion of the casing 286, including the inlet 287, is located outside of the exhaust pipe 275 and exposed to the external ambient. Inside the casing 286, the injector 283 includes a movable valve member 289, which may be shaped as a needle and which may be biased by a spring 290 to close the communication between the inlet 287 and the nozzle 288. The injector 283 may further include a solenoid 291 (e.g. and electric coil) that can be energized to generate a magnetic field that moves the valve member 289, against the action of the spring 290, towards a position in which it opens the communication between the inlet 287 and the nozzle 288, thereby causing a certain DEF quantity to be injected into the exhaust pipe 275.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 295, cam phaser 155, and the injector 283 of the SCR system 281. Note, dashed lines are used to indicate communication between the ECU 450 and the various sensors and devices, but some are omitted for clarity.

Turning now to the ECU 450, this apparatus may include a digital central processing unit (CPU) in communication with a memory system 460 and an interface bus. The CPU is configured to execute instructions stored as a program in the memory system, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

One of the tasks of the ECU 450 is that of operating the injector 283 of the SCR system 281, in order to inject into the Exhaust pipe 275 the DEF quantities needed for the SCR catalyst 282 to effectively reduce the $NO_x$ contained in the exhaust gases. To accomplish this task, the ECU 450 may implement a conventional strategy, which generally provides for determining an overall quantity of DEF to be injected and for energizing the injector solenoid 291 accordingly. More particularly, the overall DEF quantity may be split into a plurality of single injections of a smaller quantity, which are repeated up to reach the desired overall quantity. During this operating phase, the frequency of the DEF injections may be quite high, generally included between 4 and 40 injections per second. In some embodiments, these DEF injections are operated by the ECU 450 by means of a device driver that energizes the injector solenoid 291 according to a PWM strategy. In other embodiments, the ECU 450 may operate the DEF injections by means of a device driver that implements a Peak and Hold strategy.

While these DEF injections are ongoing, the ECU 450 may be configured to estimate the temperature of the injector 283 by implementing, for each one of the DEF injections, the procedure represented in the flowchart of FIG. 5.

This procedure firstly provides for estimating a primary value $T_{coil}$ of the injector temperature (block 500), which may essentially represent an estimation of the temperature of the injector solenoid 291. Afterwards, this primary value $T_{coil}$ may be corrected with several contributions, in order to calculate a final value $T_{tip}$ of the injector temperature, which may specifically represent the temperature of the tip of the injector nozzle 288. These contributions may include an exhaust gas contribution $\Delta T_{exh}$, which is determined (block 600) to quantify an injector temperature increase due to the heat exchange between the injector 283 and the exhaust gases flowing in the exhaust pipe 275. The contributions may also include an air contribution $\Delta T_{air}$, which is determined (block 700) to quantify an injector temperature decrease due to the heat exchange between the injector 283 and the ambient air that flows around the portion of the injector casing 286 that is exposed to the external ambient. The contributions may finally include a DEF contribution $\Delta T_{DEF}$, which is determined (block 800) to quantify an injector temperature decrease due to the heat exchange between the injector 283 and the diesel exhaust fluid (EDF) that flows therethrough during the injection.

The primary temperature value $T_{coil}$ may be estimated by the ECU 450 with the procedure represented in FIG. 6. This procedure provides for monitoring the electric voltage applied to the injector solenoid 291 during the DEF injection to determine a relevant value $V_{coil}$ thereof (block 505). The electric voltage may be measured by the ECU 450 by means of its embedded system and subsystem. Since the electric voltage applied to the injector solenoid 291 is generally almost constant, any voltage value sampled during the DEF injection may be considered as the relevant voltage value $V_{coil}$. In other embodiments, the relevant voltage value $V_{coil}$ may be chosen as the maximum value of the electric voltage or the average value of the electrical voltage over the DEF injection time.

The procedure also provides for monitoring the electric current that flow through the injector solenoid 291 during the DEF injection to determine a relevant value $I_{coil}$ thereof (block 510). The electric voltage may be measured by the ECU 450 by means of its embedded system and subsystem. Differently from the electric voltage, the electric current varies during the DEF injection following a so called "current profile" over the time, whose shape depends on the strategy implemented by the device driver to energize the injector solenoid 291. On the basis of the current profile, the relevant value $I_{coil}$ of the electrical current may be chosen differently. For example, if the injector solenoid 291 is energized with a PWM strategy, the relevant value $I_{coil}$ may be chosen as the maximum current value sampled during the DEF injection. If the injector solenoid 291 is energized with a Peak and Hold strategy, the relevant value $I_{coil}$ may be chosen as an average of the current values sampled during the DEF injection.

The voltage value $V_{coil}$ and the current value $I_{coil}$ are then used by the ECU 450 to estimate the electric resistance $R_{coil}$ of the injector solenoid 291 (block 515), for example according to the following equation derived from Ohm's law:

$$R_{coil} = \frac{V_{coil}}{I_{coil}}.$$

The resistance value $R_{coil}$ is then used to estimate a raw value $T_{coil}^*$ of the solenoid temperature (block 520). This estimation may be performed using a characteristic function that correlates the electric resistance of the injector solenoid 291 to its own temperature. This characteristic function may be of the following kind:

$$R_{coil} = R_{coil,0} \cdot (1 + \alpha \cdot (T_{coil} - T_{coil,0}))$$

wherein $T_{coil,0}$ is a reference value of the solenoid temperature corresponding to a reference value $R_{coil,0}$ of the solenoid resistance, and $\alpha$ is a coefficient. The characteristic function may be determined during experimental activity or provided by the supplier of the injector 283. In any case, the characteristic function can be stored in the memory system 460 to be retrieved and used by the ECU 450 to calculate the raw value $T_{coil}^*$ of the solenoid temperature as a function of the estimated value $R_{coil}$ of the solenoid electric resistance.

As a final step, the raw value $T_{coil}^*$ may be filtered to obtain the estimated value $T_{coil}$ of the solenoid temperature (block 525). This filtration may be useful for removing noises and/or errors due to the fact that the measurement of the electric current is generally available only if the injector 283 is commanded to open. For this reason, this filtration may be performed using a gradient limiter approach.

Contemporaneously, the exhaust gas contribution $\Delta T_{exh}$ may be determined by the ECU 450 with the procedure represented in FIG. 7. This procedure provides for determining an exhaust temperature value $T_{exh}$ indicative of the temperature of the exhaust gas flowing along the exhaust pipe 275 during the DEF injection (block 605). This exhaust temperature value $T_{exh}$ may be estimated by the ECU 450 on the basis of a plurality of engine operating parameters that may include, but are not limited to, intake air mass flow, engine speed and engine load. In particular, these engine operating parameters may be used as input of a mathematical model or a calibration map that yields as output the corresponding exhaust temperature value $T_{exh}$. This mathematical model or calibration map may be predetermined during an experimental activity and then stored in the memory system 460 to be retrieved and used by the ECU 450. In other embodiments, the exhaust temperature value $T_{exh}$ may be directly measured by means of a dedicated sensor.

The procedure also provides for determining an exhaust mass flow rate value $Q_{exh}$ indicative of the mass flow rate of the exhaust gas flowing along the exhaust pipe during the DEF injection (block 610). Also this exhaust mass flow rate value $Q_{exh}$ may be estimated by the ECU 450 on the basis of a plurality of engine operating parameters that may include, but are not limited to, intake air mass flow, engine speed and engine load. In particular, these engine operating parameters may be used as input of a mathematical model or a calibration map that yields as output the corresponding exhaust mass flow rate value $Q_{exh}$. This mathematical model or calibration map may be predetermined during an experimental activity and then stored in the memory system 460 to be retrieved and used by the ECU 450. In other embodiments, the exhaust mass flow rate value $Q_{exh}$ may be directly measured by means of a dedicated sensors.

The exhaust temperature value $T_{exh}$ and the exhaust mass flow rate value $Q_{exh}$ are then used to estimate an approximated exhaust gas contribution $\Delta T_{exh}^{}$, that approximately quantifies the injector temperature increase due to the heat exchange between the injector 283 and the exhaust gases flowing in the exhaust pipe 275 (block 615). More particularly, the approximated exhaust gas contribution $\Delta T_{exh}^{}$ may be estimated by the ECU 450 using the exhaust temperature value $T_{exh}$ and the exhaust mass flow rate value $Q_{exh}$ as input of a mathematical model or a calibration map that yields as output the corresponding approximated exhaust gas contribution $\Delta T_{exh}^{**}$. This mathematical model or calibration map may be predetermined during an experimental activity and then stored in the memory system 460 to be retrieved and used by the ECU 450.

The procedure may also provide for determining a fuel quantity value $F_{req}$ that is requested to be injected in the diesel engine 110 during the DEF injection (block 620). This fuel quantity value $F_{req}$ may be determined by the ECU 450 on the basis of a plurality of engine operating parameters that may include, but are not limited to, the position of the accelerator pedal as measured by the sensor 445. In particular, these engine operating parameters may be used as input of a mathematical model or a calibration map that yields as output the corresponding requested fuel quantity $F_{req}$. This mathematical model or calibration map may be predetermined during an experimental activity and then stored in the memory system 460 to be retrieved and used by the ECU 450.

The fuel quantity value $F_{req}$ is then used to calculate a correction factor $K_{fuel}$ for the approximated exhaust gas contribution $\Delta T_{exh}^{**}$ (block 625), which accounts for the delay between the instant in which the exhaust gases exit the engine 110 and the instant in which they reach the injector 283. In particular, the fuel quantity value $F_{req}$ may be used as input of another mathematical model or a calibration map that yields as output the corresponding correction factor $K_{fuel}$. This mathematical model or calibration map may be predetermined during an experimental activity and then stored in the memory system 460 to be retrieved and used by the ECU 450.

Afterwards, the approximated exhaust gas contribution $\Delta T_{exh}^{**}$ may be corrected (block 630) with the correction factor $K_{fuel}$, in order to calculate a raw exhaust gas contribution $\Delta T_{exh}^*$, for example according to the equation:

$$\Delta T_{exh}^* = K_{fuel} \cdot \Delta T_{exh}^{**}.$$

As a final step, the raw exhaust gas contribution $\Delta T_{exh}^*$ may be filtered to achieve the exhaust gas contribution $\Delta T_{exh}$ (block 635). This filtration may be useful for removing the noises due to the different dynamics of the various signals. For this reason, this filtration may be performed using a low pass filter of the first order.

Figure 8:
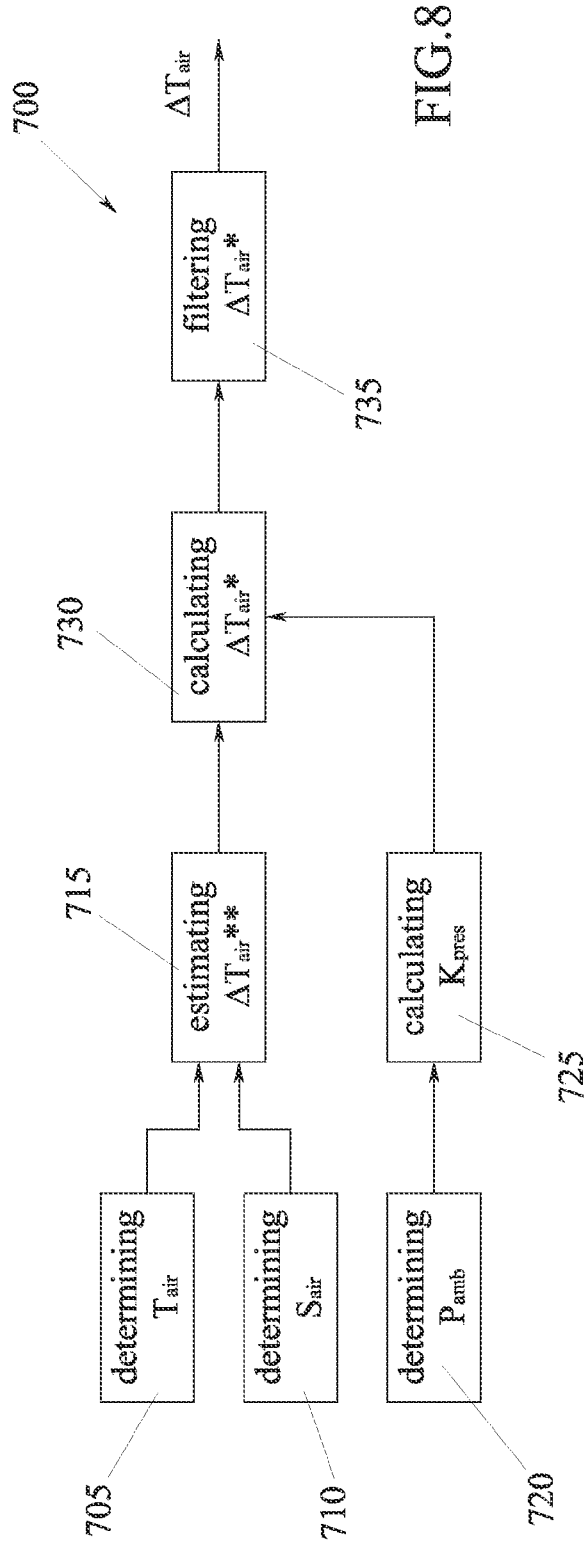
FIG. 8 is a flowchart representing a method for estimating the term $\Delta T_{air}$ in the method of FIG. 5.

Contemporaneously, the air contribution $\Delta T_{air}$ may be determined by the ECU 450 with the procedure represented in FIG. 8. This procedure provides for determining an air temperature value $T_{air}$ indicative of the temperature of the ambient air flowing around the external portion of the casing 286 of the injector 283 during the DEF injection (block 705). This air temperature value $T_{air}$ may be measured by the ECU 450 using a dedicated sensor (not shown). In other embodiments, the air temperature value $T_{air}$ could be estimated on the basis of other parameters.

The procedure also provides for determining an air speed value $S_{air}$ indicative of the speed of the ambient air flowing around the external portion of the casing 286 of the injector 283 during the DEF injection (block 710). This speed may be considered as the speed of a motor vehicle, on which the automotive system 100 may be installed. The air speed value $S_{air}$ may be measured by the ECU 450 using a dedicated sensor (not shown), for example the vehicle speedometer. In other embodiments, the air speed value $S_{air}$ could be estimated on the basis of other parameters.

The air temperature value $T_{air}$ and the air speed value $S_{air}$ are used to estimate an approximated air contribution $\Delta T_{air}^{}$, which approximately quantifies the injector temperature decrease due to the heat exchange between the injector 283 and the ambient air (block 715). This approximated air contribution $\Delta T_{air}^{}$ may be estimated by the ECU 450 using the air temperature value $T_{air}$ and the air speed value $S_{air}$ as input of a mathematical model or a calibration map that yields as output the corresponding approximated air contribution $\Delta T_{air}^{**}$. This mathematical model or calibration map may be predetermined during an experimental activity and then stored in the memory system 460 to be retrieved and used by the ECU 450.

The procedure may also provide for determining an ambient pressure value $P_{amb}$ indicative of the ambient pressure during DEF injection (block 720). This ambient pressure value $P_{amb}$ may be measured by the ECU 450 using a dedicated sensor (not shown). In other embodiments, the ambient pressure value $P_{amb}$ could be estimated on the basis of other parameters.

The ambient pressure value $P_{amb}$ is then used to calculate a correction factor $K_{pres}$ for the approximated air contribution $\Delta T_{exh}^{**}$ (block 725), which accounts for the impact of the air density on the heat exchange between the ambient air and the injector 283. More particularly, the ambient pressure value $P_{amb}$ may be used as input of a mathematical model or a calibration map that yields as output the corresponding correction factor $K_{pres}$. This mathematical model or calibration map may be predetermined during an experimental activity and then stored in the memory system 460 to be retrieved and used by the ECU 450.

Subsequently, the approximated air contribution $\Delta T_{air}^{**}$ may be corrected (block 730) with the correction factor $K_{pres}$, in order to calculate a raw air contribution $\Delta T_{air}^{*}$, for example according to the equation:

$$\Delta T_{air}^{*} = K_{pres} \cdot \Delta T_{air}^{**}.$$

As a final step, the raw air contribution $\Delta T_{air}^{*}$ may be filtered to achieve the final air contribution $\Delta T_{air}$ (block 735). This filtration may be useful for removing the noises due to the different dynamics of the various signals. For this reason, this filtration may be performed using a low pass filter of the first order.

Figure 9:
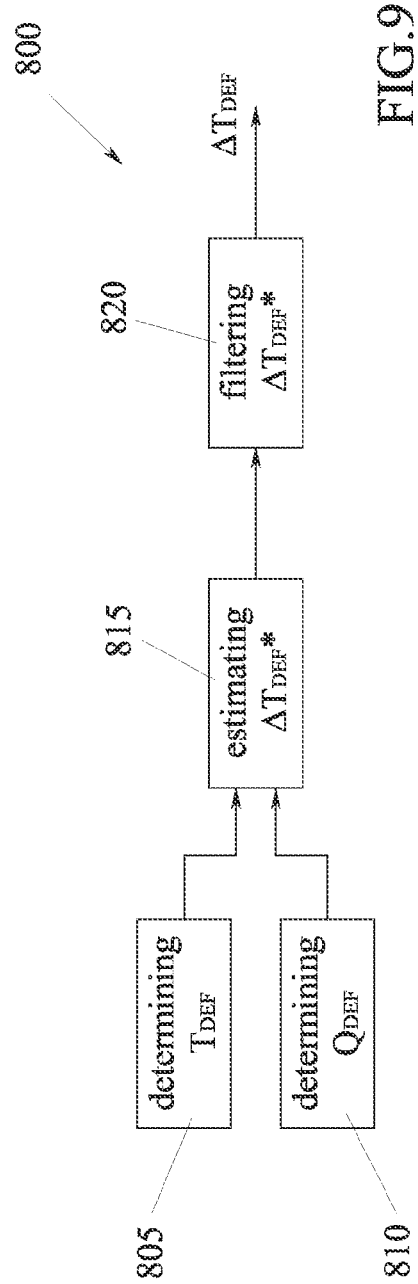
FIG. 9 is a flowchart representing a method for estimating the term $\Delta T_{DEF}$ in the method of FIG. 5.

Contemporaneously, the DEF contribution $\Delta T_{DEF}$ may be determined by the ECU 450 with the procedure represented in FIG. 9. This procedure provides for determining a DEF temperature value $T_{DEF}$ indicative of the temperature of the DEF flowing through the injector 283 during the DEF injection (block 805). This temperature may be the temperature of the DEF contained in the DEF tank 284. The DEF temperature value $T_{DEF}$ may be measured by the ECU 450 using a dedicated sensor (not shown). In other embodiments, the DEF temperature value $T_{DEF}$ could be estimated on the basis of other parameters.

The procedure also provides for determining a DEF mass flow rate value $Q_{DEF}$ indicative of the mass flow rate of the DEF flowing through the injector 283 during the DEF injection (block 810). This DEF mass flow rate value $Q_{DEF}$ may be determined by the ECU 450 as a function of the DEF quantity to be injected and the injection duration. In other embodiments, the DEF mass flow rate value $Q_{exh}$ could be directly measured by means of a dedicated sensor.

The DEF temperature value $T_{DEF}$ and the DEF mass flow rate value $Q_{DEF}$ are used to estimate a raw DEF contribution $\Delta T_{DEF}^{*}$, that quantifies the injector temperature decrease due to the heat exchange between the injector 283 and the DEF flowing therethrough (block 815). In particular, this raw DEF contribution $\Delta T_{DEF}^{*}$ may be estimated by the ECU 450 using the DEF temperature value $T_{DEF}$ and the DEF mass flow rate value $Q_{DEF}$ as input of a mathematical model or a calibration map that yields as output the corresponding raw DEF contribution $\Delta T_{DEF}^{*}$. This mathematical model or calibration map may be predetermined during an experimental activity and then stored in the memory system 460 to be retrieved and used by the ECU 450.

Lastly, the raw DEF contribution $\Delta T_{DEF}^{*}$ may be filtered to achieve the final DEF contribution $\Delta T_{DEF}$ (block 820). This filtration may be useful for removing the noises due to the different dynamics of the various signals. For this reason, this filtration may be performed using a low pass filter of the first order.

As graphically represented in FIG. 5, having determined the primary temperature value $T_{coil}$ and the contributions $\Delta T_{exh}$, $\Delta T_{air}$ and $\Delta T_{DEF}$, the final estimated value $T_{tip}$ of the injector temperature may be calculated according to the following equation:

$$T_{tip} = T_{coil} + \Delta T_{exh} - \Delta T_{air} - \Delta T_{DEF}.$$

In this way, it is advantageously possible to constantly monitor the injector temperature while the injector 283 is injecting DEF into the exhaust pipe 275.

Figure 10:
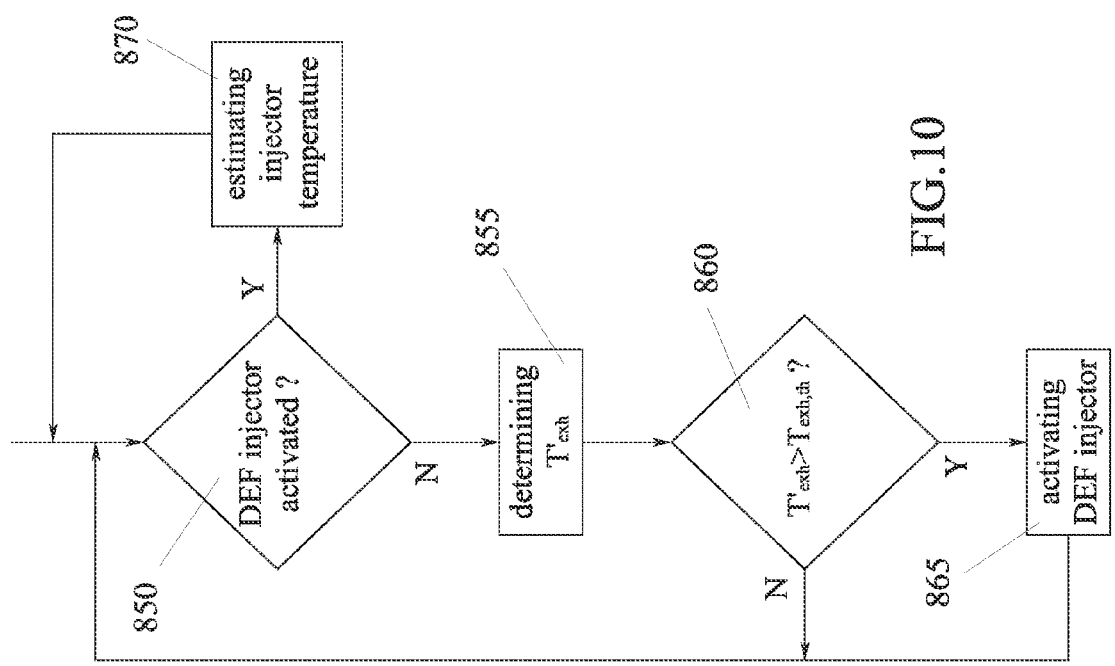
FIG. 10 is a flowchart representing a method for operating an intrusive test aimed to estimate the temperature of the DEF injector of FIG. 4.

Some embodiments may also provide for periodically measuring the injector temperature as an intrusive test by commanding the injector 283 to perform DEF injections, even when that is not requested for the SCR functioning. By way of example, one of these embodiments may implement the strategy represented in FIG. 10.

This strategy may firstly provide for the ECU 450 to continuously check if the injector 283 has been activated to perform DEF injections (block 850). If the injector 283 has not been activated, the strategy provides for the ECU 450 to determine the current temperature value $T'_{exh}$ of the exhaust gas flowing in the exhaust pipe 275 (block 855). As already explained, this exhaust temperature value $T'_{exh}$ may be estimated by the ECU 450 on the basis of a plurality of engine operating parameters or could be directly measured by means of one or more dedicated sensors.

The current value $T'_{exh}$ of the exhaust gas temperature is then compared with a threshold value $T_{exh,th}$ thereof (block 860), which may represent the exhaust gas temperature above which the injector 283 may malfunction or be damaged, for example 160° C. The threshold value $T_{exh,th}$ can be determined during an experimental activity and stored in the memory system 460 to be retrieved and used by the ECU 450.

If the current temperature value $T'_{exh}$ of the exhaust gas is below the threshold value $T_{exh,th}$, the strategy is repeated from the beginning. If conversely, the current temperature value $T'_{exh}$ of the exhaust gas is above the threshold value $T_{exh,th}$, then the strategy may provide for the ECU 450 to activate the injector 283 to perform a plurality of test DEF injections (block 865).

When the check block 850 actually identifies that DEF injections have been activated (either by the block 865 or by other SCR operating strategies), then the strategy provides for the ECU 450 to estimate the temperature of the injector 283 with the procedure described above (block 870).

Figure 11:
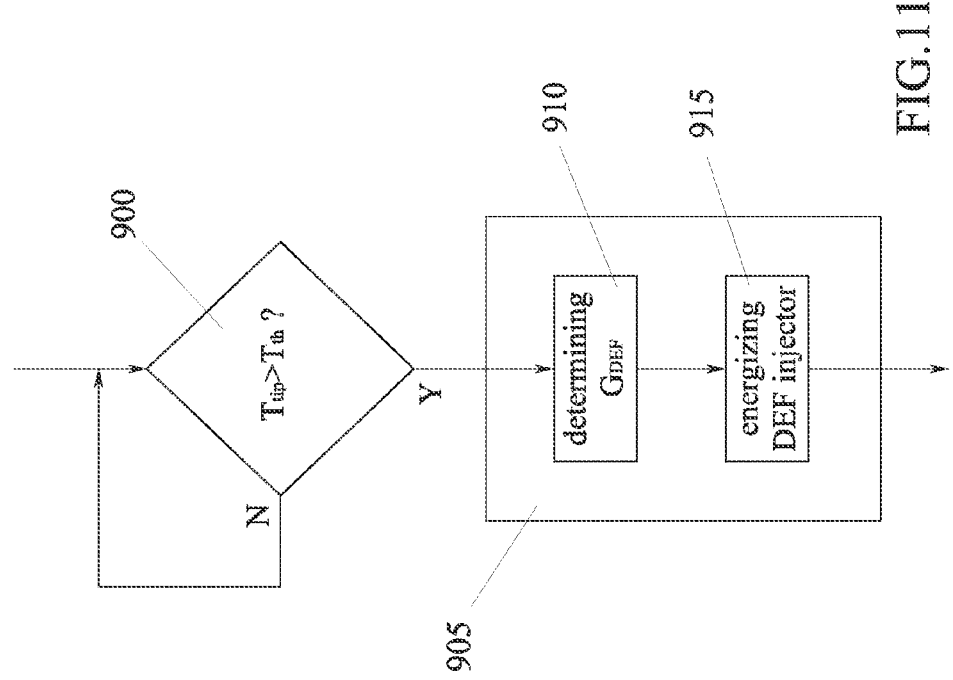
FIG. 11 is a flowchart representing a method for protect the DEF injector of FIG. 4 from overheating.

Regardless of how it is obtained, the estimated value $T_{tip}$ of the injector temperature may be practically used in a protection strategy aimed to protect the injector 283 from potential overheating that causes malfunctions or damages, an example of which is represented in the flowchart of FIG. 11. This protection strategy basically provides for the ECU 450 to compare the estimated value $T_{tip}$ of the injector temperature with a threshold value $T_{th}$ thereof (block 900), and to activate a cooling phase of the injector 283 (block 905), if the estimated value $T_{tip}$ of the injector temperature exceeds that threshold value $T_{th}$.

The threshold value $T_{th}$ of the injector temperature may represent a safety limit, above which the injector 283 may be damaged or malfunction. This threshold value $T_{th}$ may be determined by an experimental activity or provided by the supplier of the injector 283. In any case, it may be stored in the memory system 460 to be retrieved and used by the ECU 450.

The cooling phase may provide for the ECU 450 to operate the injector 283 to perform a DEF injection capable of cooling the injector itself. To do so, the ECU 450 may be configured to determine a DEF quantity $G_{DEF}$ to be injected to cool the injector 283 (block 910) and then energize the injector 283 to inject that determined quantity $G_{DEF}$ of diesel exhaust fluid (block 915).

Figure 12:
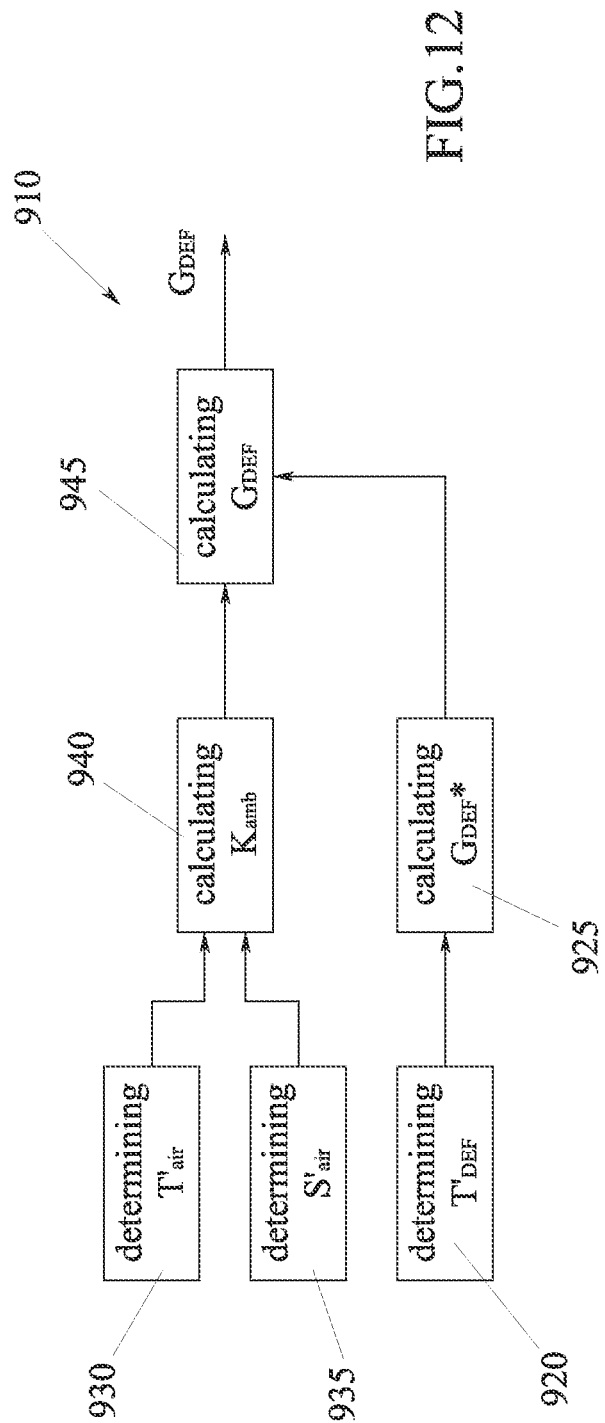
FIG. 12 is a flowchart representing a method for determining the term $G_{DEF}$ in the method of FIG. 11.

The DEF quantity $G_{DEF}$ may be calculated by the ECU 450 with the procedure represented in FIG. 12. This procedure provides for determining a current DEF temperature value $T'_{DEF}$ indicative of the temperature of the DEF to be injected (block 920). As already mentioned, this temperature may be the temperature of the DEF contained in the DEF tank 284 and it may be measured by the ECU 450 using a dedicated sensor (not shown) or estimated on the basis of other parameters.

The determined DEF temperature value $T'_{DEF}$ and the estimated value $T_{tip}$ of the injector temperature are used to calculate an approximated DEF quantity $G_{DEF}^*$ to be injected to cool the injector 283 (block 925). In other words, this approximated DEF quantity $G_{DEF}^*$ may be calculated as a function of the DEF temperature value $T'_{DEF}$ and the estimated value $T_{tip}$ of the injector temper. The function involved in this calculation may be predetermined during an experimental activity and then stored in the memory system 460 to be retrieved and used by the ECU 450.

Contemporaneously, the procedure provides for determining a current air temperature value $T'_{air}$ indicative of the temperature of the ambient air currently flowing around the external portion of the casing 286 of the injector 283 (block 930). As already mentioned, this air temperature value $T'_{air}$ may be measured by the ECU 450 using a dedicated sensor (not shown) or estimated on the basis of other parameters.

The procedure also provides for determining a current air speed value $S'_{air}$ indicative of the speed of the ambient air currently flowing around the external portion of the casing 286 of the injector 283 during the DEF injection (block 935). As already mentioned, this speed may be considered as the speed of the motor vehicle, on which the automotive system 100 may be installed and it may be measured by the ECU 450 using a dedicated sensor (not shown), for example the vehicle speedometer, or estimated on the basis of other parameters.

The current air temperature value $T'_{air}$ and air speed value $S'_{air}$ are used to calculate a correction factor $K_{amb}$ for the approximated DEF quantity $G_{DEF}^*$ (block 940), which accounts for the cooling of the injector 283 due to the heat exchange with the ambient air. In particular, the correction factor $K_{amb}$ may be calculated as a function of the air temperature value $T'_{air}$ and the air speed value $S'_{air}$. The function involved in this calculation may be predetermined during an experimental activity and then stored in the memory system 460 to be retrieved and used by the ECU 450.

Subsequently, the approximated DEF quantity $G_{DEF}^*$ may be corrected (block 945) with the correction factor $K_{pres}$, in order to calculate the final DEF quantity $G_{DEF}$, for example according to the equation:

$$G_{DEF}=K_{amb} \cdot G_{DEF}^*.$$

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A control apparatus for an exhaust fluid injector located in an exhaust pipe of an internal combustion engine and operable for exhaust fluid injection, wherein the control apparatus comprises an electronic control unit configured to:
  energize a solenoid of the exhaust fluid injector to perform an exhaust fluid injection using a pulse width modulation (PWM) strategy or a peak to hold strategy communicated from the electronic control unit (ECU) to the exhaust fluid injector, wherein the ECU is configured to operate the exhaust fluid injector;
  determine, by the ECU, an electric voltage value ($V_{coil}$) indicative of an electric voltage applied to the solenoid during the exhaust fluid injection, wherein the exhaust fluid injector comprises the injector solenoid;
  determine an electric current value ($I_{coil}$) indicative of an electric current flowing through the injector solenoid during the exhaust fluid injection;
  calculate an electric resistance ($R_{coil}$) value of the injector solenoid as a function of the determined electric voltage value ($V_{coil}$) and the electric current value ($I_{coil}$); and estimate an exhaust fluid injector temperature value ($T_{coil}$) as a function of the calculated electric resistance value ($R_{coil}$);

determine an exhaust temperature value ($T_{exh}$) of temperature of the exhaust gas flowing along the exhaust pipe during the exhaust fluid injection;

determine an exhaust mass flow rate value ($Q_{exh}$) indicative of a mass flow rate of the exhaust gas flowing along the exhaust pipe during the exhaust fluid injection;

estimate an exhaust gas contribution ($\Delta T_{exh}$) to an exhaust fluid injector temperature as a function of the determined exhaust temperature value ($T_{exh}$) and exhaust mass flow rate value ($Q_{exh}$);

correct an estimated value ($T_{coil}$) of the exhaust fluid injector temperature with the exhaust gas contribution ($\Delta T_{exh}$); and activate a cooling phase of the exhaust fluid injector when an estimated value of the exhaust fluid injector temperature ($T_{tip}$) exceeds a predetermined threshold value ($T_{th}$), by:
  determining a quantity of diesel exhaust fluid (DEF) required to cool the exhaust fluid injector; and
  injecting the quantity of DEF, by the exhaust fluid injector, by energizing the exhaust fluid injector using the PWM strategy or the peak to hold strategy communicated from the ECU to the exhaust fluid injector.

2. The control apparatus according to claim 1, wherein the electronic control unit is configured to determine an electric current value ($I_{coil}$) as a maximum value of an electric current flowing through the injector solenoid during the exhaust fluid injection.

3. The control apparatus according to claim 1, wherein the electronic control unit is configured to determine an electric current value ($I_{coil}$) as an average value of an electric current flowing through the injector solenoid during the exhaust fluid injection.

4. The control apparatus according to claim 1, wherein the electronic control unit is configured to:
  determine a fuel quantity value ($F_{req}$) that is requested to be injected in the engine during the exhaust fluid injection; calculate a correction factor ($K_{fuel}$) for an exhaust gas contribution as a function of the determined fuel quantity value ($F_{req}$); and
  correct the estimated exhaust gas contribution with the calculated correction factor ($K_{fuel}$).

5. A control apparatus for an exhaust fluid injector located in an exhaust pipe of an internal combustion engine and operable for exhaust fluid injection, wherein the control apparatus comprises an electronic control unit (ECU) configured to:
  energize a solenoid of the exhaust fluid injector to perform an exhaust fluid injection using a pulse width modulation (PWM) strategy or a peak to hold strategy communicated from the ECU to the exhaust fluid injector, wherein the ECU is configured to operate the exhaust fluid injector;
  determine, by the ECU, an electric voltage value ($V_{coil}$) indicative of electric voltage applied to the solenoid during the exhaust fluid injection;
  determine an electric current value ($I_{coil}$) indicative of electric current flowing through the injector solenoid during the exhaust fluid injection;
  calculate an electric resistance ($R_{coil}$) value of the injector solenoid as a function of the determined electric voltage value ($V_{coil}$) and the electric current value ($I_{coil}$); and estimate an exhaust fluid injector temperature value ($T_{coil}$) as a function of the calculated electric resistance value ($R_{coil}$);

determine an air temperature value ($T_{air}$) indicative of temperature of the ambient air flowing around an external casing of the exhaust fluid injector during the exhaust fluid injection;

determine an air speed value ($S_{air}$) indicative of speed of the ambient air flowing around the external casing of the exhaust fluid injector during the exhaust fluid injection;

estimate an air contribution ($\Delta T_{air}$) to an exhaust fluid injector temperature as a function of the determined air temperature value ($T_{air}$) and air speed value ($S_{air}$);

correct the exhaust fluid injector temperature value ($T_{coil}$) with the air contribution ($\Delta T_{air}$); and activate a cooling phase of the exhaust fluid injector when an estimated value of the exhaust fluid injector temperature (Ttip) exceeds a predetermined threshold value (Tth), by:
  determining a quantity of diesel exhaust fluid (DEF) required to cool the exhaust fluid injector; and
  injecting the quantity of DEF, by exhaust fluid injector, by energizing the exhaust fluid injector using the PWM strategy or the peak to hold strategy communicated from the ECU to the exhaust fluid injector.

6. The control apparatus according to claim 5, wherein the electronic control unit is configured to:
  determine an ambient pressure value ($P_{amb}$) indicative of ambient pressure during exhaust fluid injection; calculate a correction factor ($K_{pres}$) for an estimated air contribution as a function of the determined ambient pressure value ($P_{amb}$); and
  correct the estimated air contribution with the calculated correction factor ($K_{pres}$).

7. The control apparatus according to claim 5, wherein the electronic control unit is configured to:
  determine an exhaust fluid temperature value ($T_{DEF}$) indicative of temperature of the exhaust fluid flowing through the exhaust fluid injector during the exhaust fluid injection;
  determine an exhaust fluid mass flow rate value ($Q_{DEF}$) indicative of a mass flow rate of the of the exhaust fluid flowing through the exhaust fluid injector during the exhaust fluid injection;
  estimate an exhaust fluid contribution ($\Delta T_{DEF}$) to an injector temperature as a function of the determined exhaust fluid temperature value ($T_{DEF}$) and exhaust fluid mass flow rate value ($Q_{DEF}$); and
  correct an estimated value ($T_{coil}$) of the injector temperature with the exhaust fluid contribution ($\Delta T_{DEF}$).

8. The control apparatus according to claim 5, wherein the electronic control unit is configured to:
  determine an exhaust temperature value ($T'_{exh}$) indicative of temperature of the exhaust gas flowing along the exhaust pipe during the exhaust fluid injection; and
  perform the exhaust fluid injection when the determined exhaust temperature value ($T'_{exh}$) exceeds a predetermined threshold value ($T_{exh,th}$) of the exhaust gas temperature.

9. The control apparatus according to claim 5, wherein the electronic control unit is further configured to:
  determine an exhaust fluid quantity ($G_{DEF}$) to be injected to cool the exhaust fluid injector; and
  energize the exhaust fluid injector to inject the determined quantity of exhaust fluid.

10. The control apparatus according to claim 9, wherein the electronic control unit is further configured to:
- determine an exhaust fluid temperature value ($T'_{DEF}$) indicative of temperature of the exhaust fluid to be injected; and
- calculate the exhaust fluid quantity ($G_{DEF}$) as a function of the determined exhaust fluid temperature value ($T'_{DEF}$) and of the estimated value ($T_{tip}$) of the injector temperature.

11. The control apparatus according to claim 10, wherein the electronic control unit is further configured to:
- determine an air temperature value ($T'_{air}$) indicative of temperature of the ambient air flowing around an external casing of the exhaust fluid injector;
- determine an air speed value ($S'_{air}$) indicative of speed of the ambient air flowing around the exhaust fluid injector external casing;
- calculate a correction factor ($K_{amb}$) for the exhaust fluid quantity as a function of the determined air temperature value ($T'_{air}$) and air speed value ($S'_{air}$); and
- correct the calculated exhaust fluid quantity with the calculated correction factor ($K_{amb}$).

12. A method of controlling an exhaust fluid injector located in an exhaust pipe of an internal combustion engine, wherein the method comprises:
- energizing a solenoid of the exhaust fluid injector to perform an exhaust fluid injection using a pulse width modulation (PWM) strategy or a peak to hold strategy communicated from an electronic control unit (ECU) to the exhaust fluid injector, wherein the ECU is configured to operate the exhaust fluid injector;
- determining, by the ECU, an electric voltage value ($V_{coil}$) indicative of an electric voltage applied to an injector solenoid during the exhaust fluid injection, wherein the exhaust fluid injector comprises the injector solenoid;
- determining an electric current value ($I_{coil}$) indicative of an electric current flowing through the solenoid during the exhaust fluid injection;
- calculating an electric resistance ($R_{coil}$) value of the solenoid as a function of the determined electric voltage value (Vcoil) and the electric current value ($I_{coil}$); and
- estimating an exhaust fluid injector temperature value ($T_{coil}$) as a function of the calculated electric resistance value ($R_{coil}$);
- determining an exhaust temperature value ($T_{exh}$) indicative of temperature of the exhaust gas flowing along the exhaust pipe during the exhaust fluid injection;
- determining an exhaust mass flow rate value ($Q_{exh}$) indicative of a mass flow rate of the exhaust gas flowing along the exhaust pipe during the exhaust fluid injection;
- estimating an exhaust gas contribution ($\Delta T_{exh}$) to an exhaust fluid injector temperature as a function of the determined exhaust temperature value ($T_{exh}$) and exhaust mass flow rate value ($Q_{exh}$);
- correcting the exhaust fluid injector temperature value ($T_{coil}$) with the exhaust gas contribution ($\Delta T_{exh}$); and
- activating a cooling phase of the exhaust fluid injector when an estimated value of the exhaust fluid injector temperature ($T_{tip}$) exceeds a predetermined threshold value ($T_{th}$), by:
  - determining a quantity of diesel exhaust fluid (DEF) required to cool the exhaust fluid injector; and
  - injecting the quantity of DEF, by the exhaust fluid injector, by energizing the exhaust fluid injector using the PWM strategy or the peak to hold strategy communicated from the ECU to the exhaust fluid injector.

13. The method according to claim 12 further comprising determining the electric current value ($I_{coil}$) as a maximum value of the electric current flowing through the injector solenoid during the exhaust fluid injection.

14. The method according to claim 12 further comprising determining the electric current value ($I_{coil}$) as an average value of the electric current flowing through the injector solenoid during the exhaust fluid injection.

15. The method according to claim 12 further comprising:
- determining an exhaust temperature value ($T'_{exh}$) indicative of temperature of the exhaust gas flowing along the exhaust pipe during the exhaust fluid injection; and
- performing the exhaust fluid injection when the determined exhaust temperature value ($T'_{exh}$) exceeds a predetermined threshold value ($T_{exh,th}$) of the exhaust gas temperature.

16. The method according to claim 12 further comprising:
- determining an air temperature value ($T_{air}$) indicative of temperature of the ambient air flowing around an external casing of the exhaust fluid injector during the exhaust fluid injection;
- determining an air speed value ($S_{air}$) indicative of speed of the ambient air flowing around the external casing of the exhaust fluid injector during the exhaust fluid injection;
- estimating an air contribution ($\Delta T_{air}$) to the injector temperature as a function of the exhaust fluid determined air temperature value ($T_{air}$) and air speed value ($S_{air}$); and
- correcting the estimated value of the injector temperature ($T_{coil}$) with the air contribution ($\Delta T_{air}$).

\* \* \* \* \*